Sept. 26, 1939.  R. N. JANEWAY  2,174,324
RAILWAY VEHICLE
Filed May 28, 1937  2 Sheets-Sheet 1
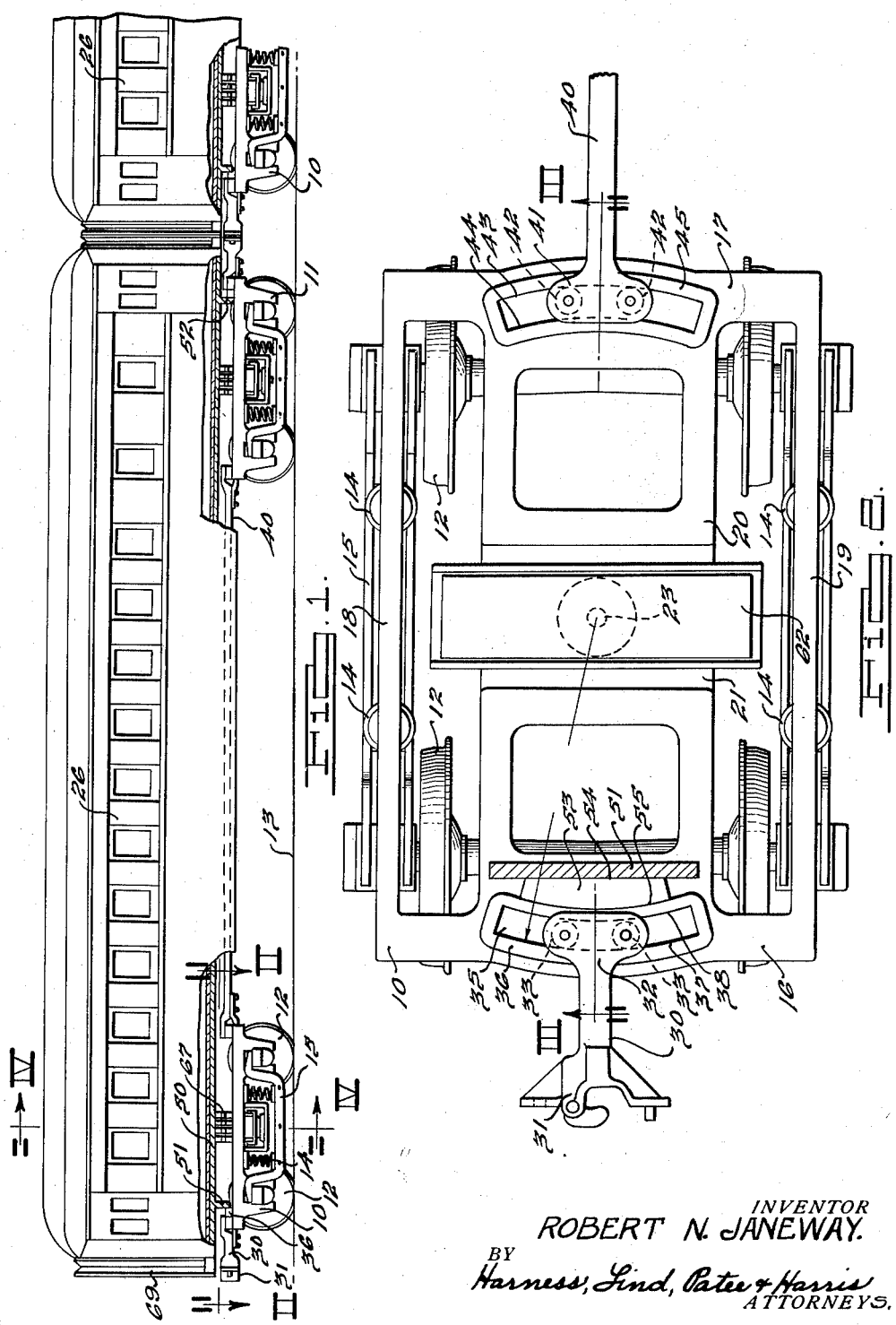
INVENTOR
ROBERT N. JANEWAY.
BY
Harness, Dind, Patee & Harris
ATTORNEYS.

Sept. 26, 1939.   R. N. JANEWAY   2,174,324
RAILWAY VEHICLE
Filed May 28, 1937   2 Sheets-Sheet 2
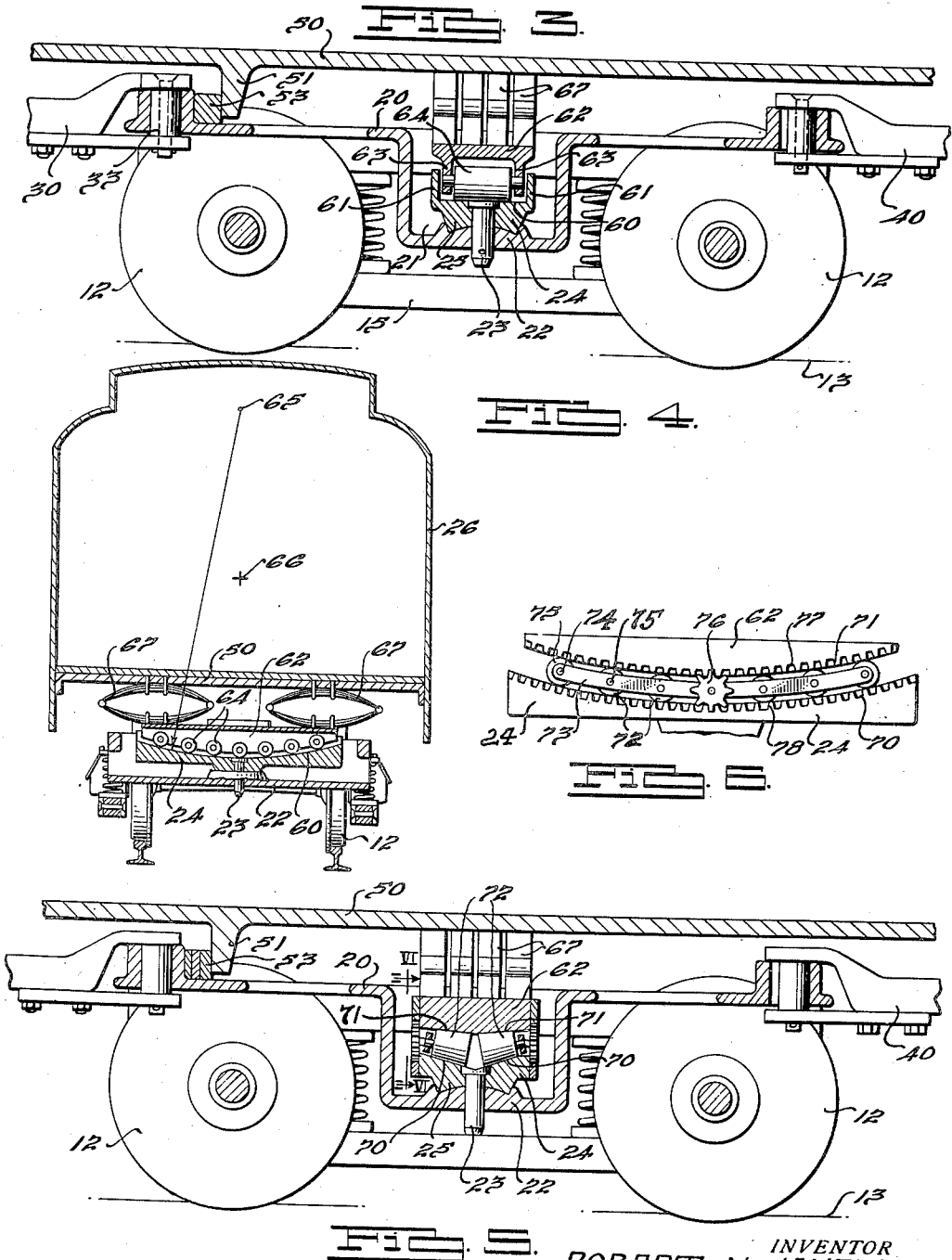
INVENTOR
ROBERT N. JANEWAY.
BY
Harness, Lind, Pater & Harris
ATTORNEYS.

Patented Sept. 26, 1939

2,174,324

UNITED STATES PATENT OFFICE 2,174,324

RAILWAY VEHICLE

Robert N. Janeway, Detroit, Mich., assignor to Chrysler Corporation, Highland Park, Mich., a corporation of Delaware Application May 28, 1937, Serial No. 145,266

2 Claims. (Cl. 105—199)

My invention relates to vehicles and it has particular relation to vehicles adapted to be hauled or drawn over rails or tracks for the transportation of both passenger and merchandise, particularly the former.

Heretofore, the primary effort made by railroad and railroad equipment designers to neutralize the effect of centrifugal force when a train passes around a curve in the tracks consisted of banking the tracks. This is a partial solution but a given angle of banking on a given radius of curvature of the track is correct for only one speed of the train, but the speeds of the trains passing over that track vary from the high speed modern passenger train to the slow speed freight. Also, if a train stopped on a curve in the track properly banked for a high speed train the lateral angularity of the car would be very unpleasant to passengers, and might even cause shifting of the load on a freight train.

As a result, banking the track is generally ineffective as far as passenger comfort or car loading is concerned although it does probably increase the speed at which such track curves may be negotiated.

By my invention I have eliminated all of the shortcomings of the banked track and have provided a means for insuring that each car assumes the proper degree of inclination at all times, taking into account the radius of curvature of the track, and the speed of each train. In addition, it compensates for any angle of banking which is improper for the speed of any particular train.

One object of my invention is to improve the riding qualities of railroad cars employed in the haulage of both passengers and merchandise.

A second object of my invention consists in providing means whereby each car body will automatically adjust its angle of inclination with respect to the horizontal to compensate for banked tracks, speed and radius of curvature of track so as to neutralize the effect of centrifugal force and of uneven tracks on the passengers and on any merchandise being carried thereby.

An additional object of my invention comprises providing a simple, durable and inexpensive structure for accomplishing the aforementioned objects which will be automatic in operation and substantially troubleproof throughout its life.

A still further object of my invention is to provide a novel type of railway car wherein tension forces may be transmitted through each vehicle independently of the car body by means of relatively light weight inexpensive mechanism and wherein the excessive compression forces are permitted to pass through the car body.

For a better understanding of my invention, reference may now be had to the accompanying drawings, in which:

Fig. 1 is a view, partially in side elevation and partially in cross section, of one complete car and a portion of a second car constructed in accordance with my invention.

Fig. 2 is a plan view of one of the trucks illustrated in Fig. 1, the view being taken along the line II—II thereof.

Fig. 3 is a vertical longitudinal cross-sectional view of one of the trucks illustrated in Figs. 1 and 2, the section being taken along the line III—III of Fig. 2.

Fig. 4 is a vertical transverse cross-sectional view of the structure illustrated in Fig. 1, the section being taken along the line IV—IV thereof.

Fig. 5 is a vertical longitudinal cross-sectional view, somewhat similar to Fig. 3, illustrating a modified form which my invention may assume.

Fig. 6 is a fragmentary detail view of a portion of the structure illustrated in Fig. 5.

In the structure illustrated in Fig. 1, I have illustrated two spaced railway truck frames 10 and 11, each provided with wheels 12 which roll upon a railway track 13. Each truck frame is supported by means of coil springs 14 which rest on equalizer bars 15, which, in turn, transfer the weight thereof to the wheels of the trucks. The truck frame 10 comprises two end portions 16 and 17, two side portions 18 and 19, and a central portion 20, the portions 18 and 19 supporting the frames through the springs 14 as previously described. The central portion 20 is provided with a recess 21 at its central point, in the center of which is disposed a center bearing 22 through the center of which extends a vertically disposed king pin 23 and on which is mounted a lower platform 24. The platform 24 is provided with a cooperating center bearing 25 by means of which the platform is rotatably supported with respect to the car frame about the axis of the vertically arranged king pin 23. A car body 26 is supported upon the platform 24, as will be later described.

The end portion 16 of the truck frame 10 has secured thereto a drawbar 30 provided at one end with a coupling member 31, of the rigid non-bendable type, and at its other end has a supporting structure 32 on which is rotatably supported two roller members 33. These roller members are adapted to ride within an arcuate opening 35 in a guide member 36 which is suitably secured to the frame 16. The opening is bounded by two cylindrical arcuate surfaces 37 and 38 which represent arcs drawn about the center of the king pin 23, and therefore of the center bearing 22, as an axis, and are spaced a distance slightly greater than the diameter of the roller members 33. When tension is exerted upon the drawbar 30 the roller members 33 roll upon the outer arcuate surface 37, about the axis of the king pin 23 as a center, so that, regardless of the direction in which the tension is exerted, for example, when a train is passing around a curve in a track, the force transmitted by the drawbar 30 to the truck frame has an effective center of application on the truck frame at the axis of the king pin 23. This likewise results in having the drawbar center itself automatically on the arcuate surfaces 37 or 38 so that, if the adjoining car is similarly equipped, the forces pass directly from the center bearing of one truck of one car to the center bearing of the adjacent truck of the interconnected car. Likewise, when compression forces are exerted through the coupling member 31, the rollers 33 will engage the inner arcuate surface 38 and the center of application of such compression forces, owing to the ability of the drawbar to center itself, will have an effective point of application at the axis of the king pin 23.

A link 40 serves to interconnect the two trucks of each railroad car, this link being provided on each end, as best shown in Fig. 2, with a supporting member 41 on which is rotatably journalled two roller members 42, which are adapted to roll on arcuate faces 43 and 44 of an arcuate guide member 45 attached to the end 17 of the truck frame 10. The arcs of the faces 43 and 44 are likewise drawn about the axis of the king pin 23 as an axis. The surfaces 43 and 44 are likewise spaced a distance slightly greater than the diameter of the roller members 42 so that they may ride on either of the arcuate surfaces with which they are adapted to contact without frictional engagement with the oppositely disposed arcuate surface. As the arcs are drawn about the center of the king pin 23 it is apparent that all forces transmitted by the link 40, which in effect constitutes an internal drawbar, will have an effective center of application on the truck frame at the axes of the pin 23. As a result, regardless of the angular position of the trucks 10 and 11 with respect to each other, the distance between the effective points of application of the link 40 remains unaltered.

By reason of the described arrangement of parts, any tension that is transmitted from the adjoining car through the vehicle in question to the next adjacent car passes through the coupling 31, the drawbar 30, the arcuate guide 36, the frame of the truck 10 to the arcuate guide 45 and thence to the link 40 to the truck 11 and its cooperating coupling member. This transmission of tension, it should be noted, has occurred without passing through any portion of the car body 26, thus passing independently thereof.

The car body 26 is provided with a floor portion 50 which has a downwardly extending shoulder 51 at one end thereof and a correspondingly downwardly extending oppositely disposed shoulder 52 at the opposite end thereof. The shoulders 51 and 52 extend downwardly into the horizontal plane of the guide members 36 and 45 and are separated therefrom by floating blocks 53, each of which presents a flat transversely extending vertical surface 54 to a correspondingly shaped face on the shoulder 51 and an arcuate face 55 in contact with the correspondingly shaped portion of the arcuate guide 36. As a surface 55 represents an arc drawn about the center of the king pin 33 as an axis, it will be apparent that pivotal movement of the truck with respect to the car body will cause movement between the surface 55 of the block 53 and the inner face of the guide member 36 without causing any separation of those surfaces. In like manner, the vertical movement of the shoulder 51 with respect to the block 53 is permitted between the vertical face 54 of the block 53 and the shoulder member 51 without causing separation of those surfaces. The floating block 53 always closely engages the adjoining surfaces and should preferably be provided with readily lubricated surfaces, or possibly with self lubricating surfaces, so that no friction will arise between the block and the several surfaces which it engages. The floating block structure is the subject matter of co-pending application, Serial No. 145,403, filed by William Van Der Sluys.

By reason of the previously described construction it will be apparent that when any compressive forces are exerted through the vehicle by means of the drawbar 30, such forces are transmitted directly through the guide member 36 to the block 53, thence to the shoulder 51 of the car body 26, through the car body to the shoulder 52 thereof at the opposite end of the car, and thence through the second floating block member 53 and pivotally movable drawbar to the coupling at the opposite end of the car.

The advantage of this construction is that with the car body sprung on the truck frames, as will be hereinafter described, all tension forces being transmitted along the train through the car may be transmitted through the trucks and the internal drawbar 40 independently of the car body, thus permitting the car body to move freely on those springs under those conditions, which represent probably 99 per cent of the operation on the car. On the other hand, the compressive forces especially at time of impact in shifting cars, are ordinarily very much greater than the tension forces and if they were to be carried by the internal drawbar or link 40 it would of necessity be an extremely heavy and rigid member. However, by the arrangement just described, the relatively great compressive forces transmitted through the vehicle, which represents only a very small portion of the operating time of the car, are transmitted through the car body itself, thus permitting the use of a relatively light and inexpensive link 40 and at the same time employing the advantages of a freely sprung car body throughout 99 percent of its operation.

The lower platform 24, which is mounted on the center bearings 22 and 25, is provided with a transversely extending arcuate track or surface 60, at each side of which is a flange 61. A second or upper platform 62 is mounted above the platform 24 and has two downwardly projecting flanges 63 between and in which are journalled a plurality of roller members 64, which are adapted to roll on the track 60, generally transversely of the platform 24 and therefore transversely of the railroad track 13. The track surface 60 represents an arc drawn about an axis extending longitudinally of the car body and represented by a point 65 located near the roof of the car body 26, and in a higher plane than is the center of gravity of the car body as represented by an axis 66, as indicated in Fig. 4. When the car body is in its normal horizontal position, as shown in Fig. 4, the points 65 and 66 will ordinarily be in a vertical plane on the centerline of the car body 26 with the point 65 materially higher than the point 66 although the point 65 can, of course, be varied at will in designing the arcuate surface 60.

Mounted on each end of the platform 62 is a pair of elliptical springs 67 which support the weight of the car body 26 so that the center of suspension of the platform 24 occurs in the vertical axis of the king pin 23 and the center of suspension of the car body 26 likewise occurs at a point intermediate the springs 67 and therefore coincides with the center of suspension of the platform 24.

With the foregoing arrangement it is apparent that when the car body is subjected to any centrifugal forces such, for example, as when the train is passing around a curve in the tracks, the roller members 64 will roll on the tracks 60, thus moving about a point 65 as an axis. As the platform 62, and therefore the car 26, is free to move on the surface 60 through the rollers 64, the car will automatically be inclined or tilted to an angle proportional to the centrifugal force acting on the car body.

As the car body tilts about the longitudinal axis 65, the various objects in the car body 26 remain in equilibrium regardless of the radius of curvature of the track or the speed of the train, as the car body will adjust itself to both of these factors automatically. As the car leaves the curve in the track it will gradually restore itself to its normal vertical position, owing to the fact that its center of gravity is located beneath the point 65, about which the car moves as an axis.

In like manner, if the train should be stopped on a curve of the railroad track which is banked, the car will automatically right itself because, under those conditions, no centrifugal force will be acting and the point 66 will assume a position vertically beneath the point 65 so that no discomfort or tilting of the car body will be present. As the car starts to move ahead it will automatically resume its original vertical position with respect to the truck frames, provided that no centrifugal force is present, as soon as the car leaves the banked portion of the track. In this manner the effect of banking of the track as well as the effects of centrifugal force are neutralized by the structure previously described. This adds materially to the comfort of the passengers and prevents the shifting of loads of merchandise which, if fragile, may be seriously damaged thereby.

It will be noted that, as all tension loads are taken through the truck frames and the internal drawbar 40, leaving the car body free of any forces being transmitted through the train, it is entirely free to adjust itself to the proper position to neutralize the effect of centrifugal force or the banking of the track under all conditions excepting when compressive forces are being exerted between the trucks which pass through the car body which is but a very small percentage of the normal period of operation. As the surfaces of the floating block 53 are well lubricated the car body will generally move to the proper angle of inclination even when compressive forces are being transmitted therethrough.

As illustrated in Fig. 1, the center of suspension of the car body is located at some little distance from the end of the car body. I have found by experiment that the best riding qualities in a car body, be it passenger car or freight car, result when the center of suspension of either end of the car falls in the vertical transverse plane containing the center of percussion of the car body with respect to an axis of rotation falling in the vertical transverse plane of the center of suspension of the opposite end of the car body. When this condition is maintained, any lateral or vertical forces imparted to the car body through the suspension means at one end of the car body causes a movement of that car body as a whole about a point in the vertical transverse plane of the center of suspension thereof at the opposite end of the car without causing any bodily displacement of the other end of the car with respect to its center of suspension.

It is highly desirable to avoid bodily displacement of the opposite end of the car body with respect to its center of suspension caused by a lateral or vertical force received at first mentioned end of the car because this displacement causes the springs at the opposite end of the car to tend to move the car body back to its original relationship with respect to the original center of suspension, thus initiating a set of lateral or vertical forces which in turn are reflected back to the center of suspension from whence the original disturbance came and continues in that manner until dissipated by ordinary friction or the use of shock absorbing.

It is, of course, practically impossible to have the centers of percussion fall exactly in the plane of the center of suspension under all conditions owing to the fact that the centers of percussion vary according to the disposition of the load of the car. As a result, I have found it is sometimes desirable to have the centers of percussion a slightly greater distance apart than are the centers of suspension when the car is empty so that, under normally loaded conditions, the centers of percussion will move toward each other into substantial alignment with the centers of suspension. Although it will be found that the best riding qualities are secured when the centers of percussion and centers of suspension are in alignment, nevertheless, a materially improved ride over the present type of railroad cars will be acquired if they are moved into proximity to each other.

It is highly desirable, in practicing my invention, that the drawbar 30 and the couplings 31 be of such length as to maintain the ends of the car bodies in spaced relation because any frictional contact to the end of the car bodies will not only prevent the freedom of tilting of the individual car bodies about the axis 65, when the cars are subject to centrifugal force, in passing around curves in the tracks, but will also serve to transmit lateral or vertical forces which add to the discomfort of the passengers by causing additional and unnecessary movement of the car bodies so engaged by each other. In addition, I find it desirable to have the bellows mechanism 69, which is employed at the end of passenger cars to protect the passenger while passing from one car body to the next, of such nature that it will not transmit any forces of any nature between the car bodies and will not prevent the freedom of movement of one car body with respect to the other.

From the previous description it will be apparent that rotatable movement of the car body 26 about the axis 65 will not be interfered with by the contact of the shoulder 51 with the floating block 53 owing to the fact that they present to each other perfectly vertical, transversely extending, highly lubricated surfaces so that vertical movement of the shoulder 51 or angular movement of the shoulder 51 about the axis 65 will be permitted by the engagement of the flat surface 54 with the face of the shoulder 51 without moving those surfaces out of engagement.

In the structure illustrated in Fig. 5 I employ a lower platform 24 pivotally mounted upon the center bearing 22 by means of the bearing 25, and an upper platform 62 on which is mounted the car supporting springs 67, as previously described. In this construction, however, the roller track surface on the platform 64 consists of two arcuate surfaces 70 which are inclined toward each other, viewed longitudinally of the car, and, being arcuate, slope toward each other from the two sides thereof. In like manner, the block 62 is provided with two oppositely inclined roller engaging surfaces 71 which likewise are inclined toward each other. The surfaces 70 and 71, however, are disposed at somewhat different angles and disposed intermediate those surfaces are a plurality of tapered rollers 72, the rollers being tapered owing to the fact that the paths of travel of the various portions thereof differ in length because of the longitudinal inclination of the surfaces 71 and 70. These tapered rollers serve an additional purpose in that they serve to prevent any longitudinal shifting of the platform 62 with respect to the platform 24, and take longitudinal thrust without friction.

As best illustrated in Fig. 6, I have provided means for maintaining the roller members 72 in properly spaced relationship with respect to each other between the tracks 70 and 71. This is accomplished by employing at each end of the rollers a spacing member 73 provided with openings 74 into which are rotatably fitted small centrally disposed projections or shafts 75 on the ends of the roller 72. One of the rollers, in the illustration the central roller, is provided on the end of its shaft 75 with a toothed gear 76 which is adapted to mesh with an arcuate rack 77 mounted on the edge of the track 71 and with an arcuate rack 78 mounted on the edge of the track 70. With this construction when movement of the platform 62 occurs with respect to the platform 24 the toothed roller 76 will roll on both racks 77 and 78, causing the rollers 72 to move uniformly on their tracks 71 and 70, maintaining at all times the properly spaced relationship.

The roller aligning structure illustrated in Fig. 6 may readily be employed with the flat type of track as illustrated in Fig. 3 if the rollers 64 thereof engage an upper track on the member 62.

Although my invention has been described primarily in connection with passenger cars, it will be apparent that the same construction may equally well be used on cars adapted for the hauling of any kind of merchandise and will be efficacious in preventing the spilling of liquids, such as on milk trains, and the considerable pains now gone to in packing cars to prevent the shifting of fragile merchandise owing to centrifugal force may be dispensed with where my invention is employed. The collapsible bellows 69 are, of course, not necessary where the invention is employed on freight trains but otherwise the constructions may be substantially identical.

Although I have illustrated several forms which my invention may assume and have described in detail several applications thereof, it will be apparent to those skilled in the art that it is not so limited, but that various changes and modifications may be effected therein without departing from the spirit of my invention or from the scope of the appended claims.

I claim:

1. In a railway vehicle, two spaced trucks, a truck bolster mounted on each of said trucks and provided with a center bearing, a body bolster pivotally mounted on each of said center bearings, two oppositely inclined transversely disposed arcuate tracks mounted on each of said body bolsters, a platform disposed above each of the body bolsters and provided on its lower face with two oppositely inclined transversely extending arcuate tracks, the arc of each of said arcuate tracks having an axis above the tracks in the vertical longitudinal center plane of the vehicle, two sets of tapered roller members disposed intermediate said pairs of tracks, spacing means adapted to retain said roller members in spaced relationship, a gear wheel mounted on one of said rollrs and disposed in meshing agreement with arcuate racks on said body bolster and platform member, springs mounted on said platforms, and a car body mounted on said springs.

2. In a railway vehicle, two spaced trucks, a truck bolster mounted on each of said trucks and provided with a center bearing, a body bolster pivotally mounted on each center bearing, two oppositely inclined transversely extending arcuate tracks mounted on said body bolster, a platform disposed above each of the body bolster and provided on its lower face with two oppositely inclined transversely extending arcuate tracks, the arc of each of said arcuate tracks having an axis above the tracks in the vertical longitudinal center plane of the vehicle, two sets of tapered roller members disposed intermediate said pairs of tracks, and a car body mounted on said platforms.

ROBERT N. JANEWAY.